US 6,728,313 B1

(12) United States Patent
Tu et al.

(10) Patent No.: US 6,728,313 B1
(45) Date of Patent: Apr. 27, 2004

(54) METHOD AND APPARATUS FOR PERFORMING MPEG II DEQUANTIZATION AND IDCT

(75) Inventors: Kuei-Chung Tu, San Jose, CA (US); Yan Liu, San Jose, CA (US); Jack Ouyang, Cupertino, CA (US); Xiaoping Hu, San Jose, CA (US); Roger Hsu, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/174,880

(22) Filed: Jun. 18, 2002

Related U.S. Application Data

(62) Division of application No. 09/004,544, filed on Jan. 8, 1998, now abandoned.

(51) Int. Cl.[7] .................................................. H04N 7/12
(52) U.S. Cl. .................................................. 375/240.03
(58) Field of Search ........ 348/720; 375/240.01–240.07, 375/240.12, 240.15, 240.18, 240.2, 240.25, 240.26; 382/232, 236, 238, 248, 250, 251; 708/203, 402, 607, 650; H04N 7/12, 7/30

(56) References Cited

U.S. PATENT DOCUMENTS

| 5,065,346 | A |   | 11/1991 | Kawai et al. ................ 395/128 |
| 5,136,385 | A |   | 8/1992 | Campbell ................... 358/160 |
| 5,357,282 | A | * | 10/1994 | Lee .......................... 375/240.2 |
| 5,410,352 | A | * | 4/1995 | Watanabe .............. 375/240.03 |
| 5,418,962 | A |   | 5/1995 | Bodin et al. ................. 395/700 |
| 5,428,456 | A |   | 6/1995 | Parulski et al. ............. 358/340 |
| 5,467,131 | A | * | 11/1995 | Bhaskaran et al. ..... 375/240.25 |
| 5,477,242 | A |   | 12/1995 | Thompson et al. .......... 345/132 |
| 5,523,847 | A | * | 6/1996 | Feig et al. ................... 382/250 |
| 5,592,194 | A |   | 1/1997 | Nishikawa ................... 345/127 |
| 5,699,117 | A | * | 12/1997 | Uramoto et al. ........ 375/240.26 |
| 5,754,235 | A | * | 5/1998 | Urano et al. ........... 375/240.03 |
| 5,768,429 | A | * | 6/1998 | Jabbi et al. .................. 382/232 |
| 5,777,679 | A | * | 7/1998 | Cheney et al. .......... 375/240.15 |
| 5,825,680 | A | * | 10/1998 | Wheeler et al. ............. 708/650 |
| 5,844,609 | A | * | 12/1998 | Filor et al. ................ 375/240.2 |
| 5,903,312 | A | * | 5/1999 | Malladi et al. ......... 375/240.03 |
| 5,909,254 | A | * | 6/1999 | Feig et al. ................... 348/720 |
| 5,936,669 | A | * | 8/1999 | Niesen ................... 375/240.12 |

* cited by examiner

Primary Examiner—Richard Lee
(74) Attorney, Agent, or Firm—Thelen Reid & Priest, LLP; Marc Hanish

(57) ABSTRACT

A dequantization block is provided for performing dequantization calculations on a block of encoded video signal data using a modified standard quantization matrix. The modified standard quantization matrix is a product of a standard quantization matrix and a diagonal cosine matrix. The dequantization block receives a modified standard quantization matrix, the modified standard quantization matrix being a product of a standard quantization matrix corresponding to the encoded video data stream and a diagonal cosine matrix. In addition the dequantization block receives a scale representing a compression ratio of the encoded video data stream and non-zero IDCT coefficient matrix corresponding to a block of the encoded video data. The dequantization block then multiplies the scale, the non-zero IDCT coefficient matrix and the modified standard quantization matrix. An IDCT block is provided for performing IDCT calculations on each block processed by the dequantization block. The IDCT block then performs IDCT column and row calculations on the dequantization video signal data using a pipelining technique.

37 Claims, 5 Drawing Sheets

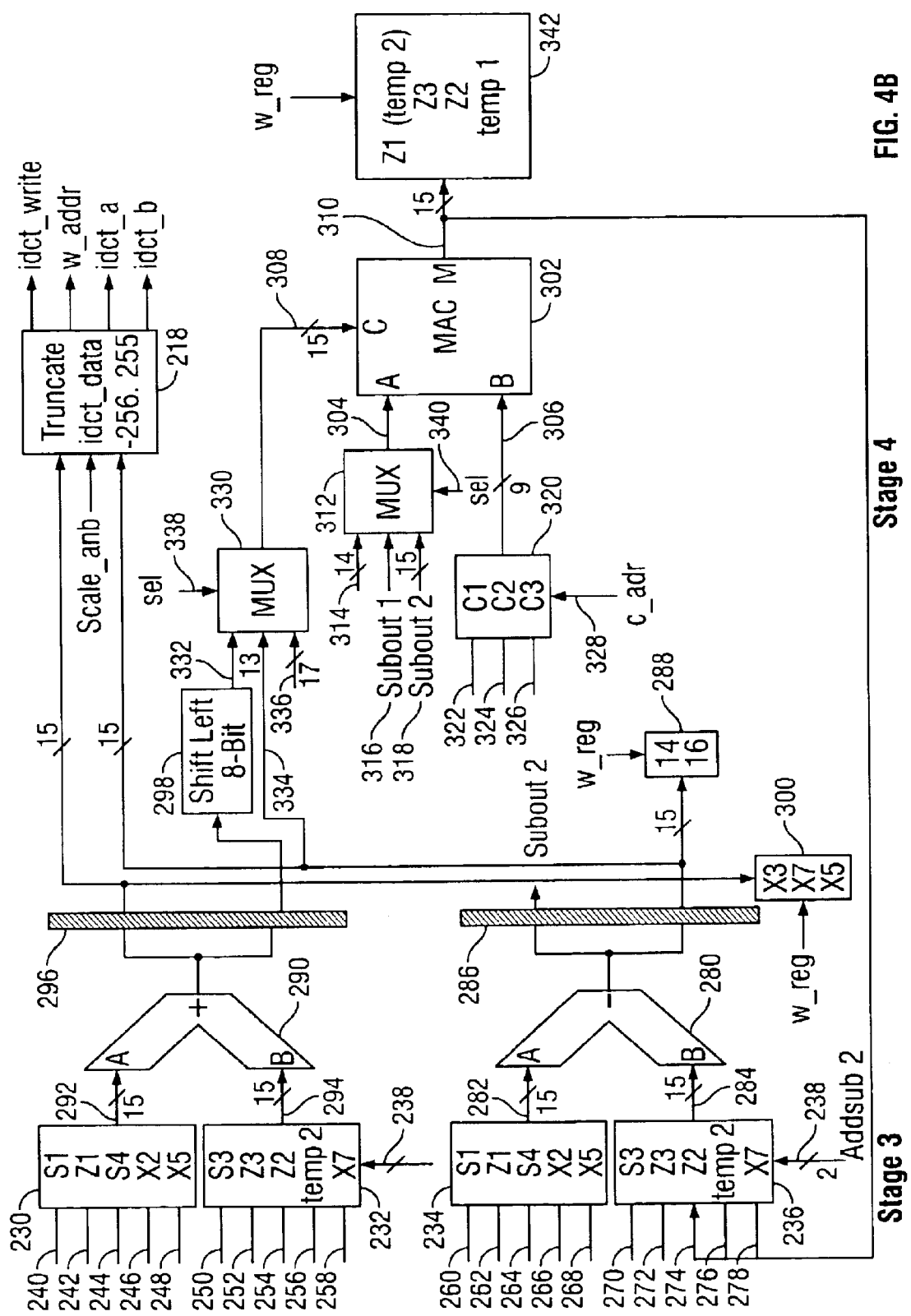

METHOD AND APPARATUS FOR PERFORMING MPEG II DEQUANTIZATION AND IDCT

CROSS-REFERENCE TO RELATED APPLICATION

This application is a DIV of application Ser. No. 09/004,544, entitled "Method and Apparatus For Performing MPEG II Dequantization and IDCT", filed on Jan. 8, 1998 now abandoned.

BACKGROUND OF THE INVENTION

1. Field of the Invention

The present invention relates to a method and apparatus for operating a video decoder at an increased rate of speed. More particularly, the present invention relates to a method and apparatus for performing dequantization and Inverse Discrete Cosine Transform (IDCT) on video signal data in a video decoder at a rate of speed compatible with a 30 frames per second motion picture quality.

2. The Background Art

Graphics and video processing are operation intensive. At the same time, highspeed processing is particularly important in the areas of video processing, image compression and decompression. Furthermore, with the growth of the "multimedia" desktop, it is imperative that computer systems accommodate high-speed graphics, video processing, and image compression/decompression to execute multimedia applications. Accordingly, it would be desirable if a video decoder were designed to maintain a speed compatible with a 30 frames per second motion picture quality.

Video decoding includes the steps of dequantization, IDCT, motion compensation, and color space conversion. Each picture, or frame, processed by the video decoder comprises a plurality of macroblocks, each of which further comprise a plurality of blocks of encoded video signal data. Dequantization is performed on each block of encoded video signal data, and produces an 8×8 matrix corresponding to each block. Since IDCT typically includes multiplication of each of these 64 dequantization values by a cosine matrix, the IDCT process is particularly time-consuming, and a bottleneck of the speed of the decoder.

The speed of the decoder is limited by the speed of the IDCT process. Typically, as many as 10 multiplications are required to complete one IDCT row or column calculation. For a resolution of 640×480, the number of blocks in each frame to be processed for a 4:2:0 format is 7200. Thus, the total number of calculations required to process one frame is 10*(8+8)*7200=1,152,000. Clearly, the number of calculations performed during the IDCT process substantially limits the speed of the decoder.

According to current standards, it would be desirable to maintain the quality of the decoder at 30 frames per second as required for the motion picture quality. Therefore, it would be beneficial if the speed of the IDCT process could be increased, thereby speeding up the decoding process. A need exists in the prior art for a method for performing the IDCT calculations at an increased rate of speed through reducing the number of IDCT calculations required.

BRIEF DESCRIPTION OF THE INVENTION

The present invention provides an improved method and apparatus for performing dequantization and IDCT calculations in an MPEG-II decoder. A dequantization block is provided for performing dequantization calculations on a block of encoded video signal data using a modified standard quantization matrix. The modified standard quantization matrix is a product of a standard quantization matrix and a diagonal cosine matrix. An IDCT block is provided for performing IDCT calculations on each block processed by the dequantization block. Through combination of the standard quantization and diagonal cosine matrices prior to the IDCT process, the number of operations required during the IDCT process is substantially reduced.

The dequantization block receives a modified standard quantization matrix, the modified standard quantization matrix being a product of a standard quantization matrix corresponding to the encoded video data stream and a diagonal cosine matrix. In addition the dequantization block receives a scale representing a compression ratio of the encoded video data stream and a non-zero IDCT coefficient matrix corresponding to a block of the encoded video data. The dequantization block then multiplies the scale, the non-zero IDCT coefficient matrix and the modified standard quantization matrix to produce dequantization video signal data.

The IDCT block receives each block of processed data from the dequantization block. The IDCT block then performs IDCT row and column calculations on the dequantization video signal data according to a set of IDCT butterfly operations.

The present invention includes a dequantization block and an IDCT block which operate in parallel to maximize the speed of the MPEG-II decoder. Through the movement of multiplication of a cosine matrix typically performed during the IDCT process to the prior dequantization step, the remaining steps in the IDCT process are recombined to reduce the total number of operations required by the IDCT block. As a result, the total number of operations performed during decoding is substantially reduced, and the speed of the decoding process is correspondingly increased.

BRIEF DESCRIPTION OF THE DRAWINGS

FIGS. 4A and 4B illustrate an IDCT data path according to a presently preferred embodiment of the present invention.

DETAILED DESCRIPTION OF THE PREFERRED EMBODIMENTS

In the following description, a preferred embodiment of the invention is described with regard to preferred process steps and data structures. However, those skilled in the art would recognize, after perusal of this application, that embodiments of the invention may be implemented using a set of general purpose computers operating under program control, and that modification of a set of general purpose computers to implement the process steps and data structures described herein-would not require undue invention.

The present invention uses a parallel architecture to implement the dequantization and IDCT blocks. Each macroblock (MB) comprises 6 blocks, each 8×8 block comprising 64 data. Thus, each of these blocks is processed in parallel by the dequantization and IDCT blocks. Through combining the quantization matrix with a diagonal cosine matrix prior to the dequantization calculations, the number of multiplications required by the IDCT process to complete one row or column calculation is reduced to 5. As a result, the present invention increases the throughput of the IDCT process, resulting in a substantial increase in processing speed.

Figure 1:
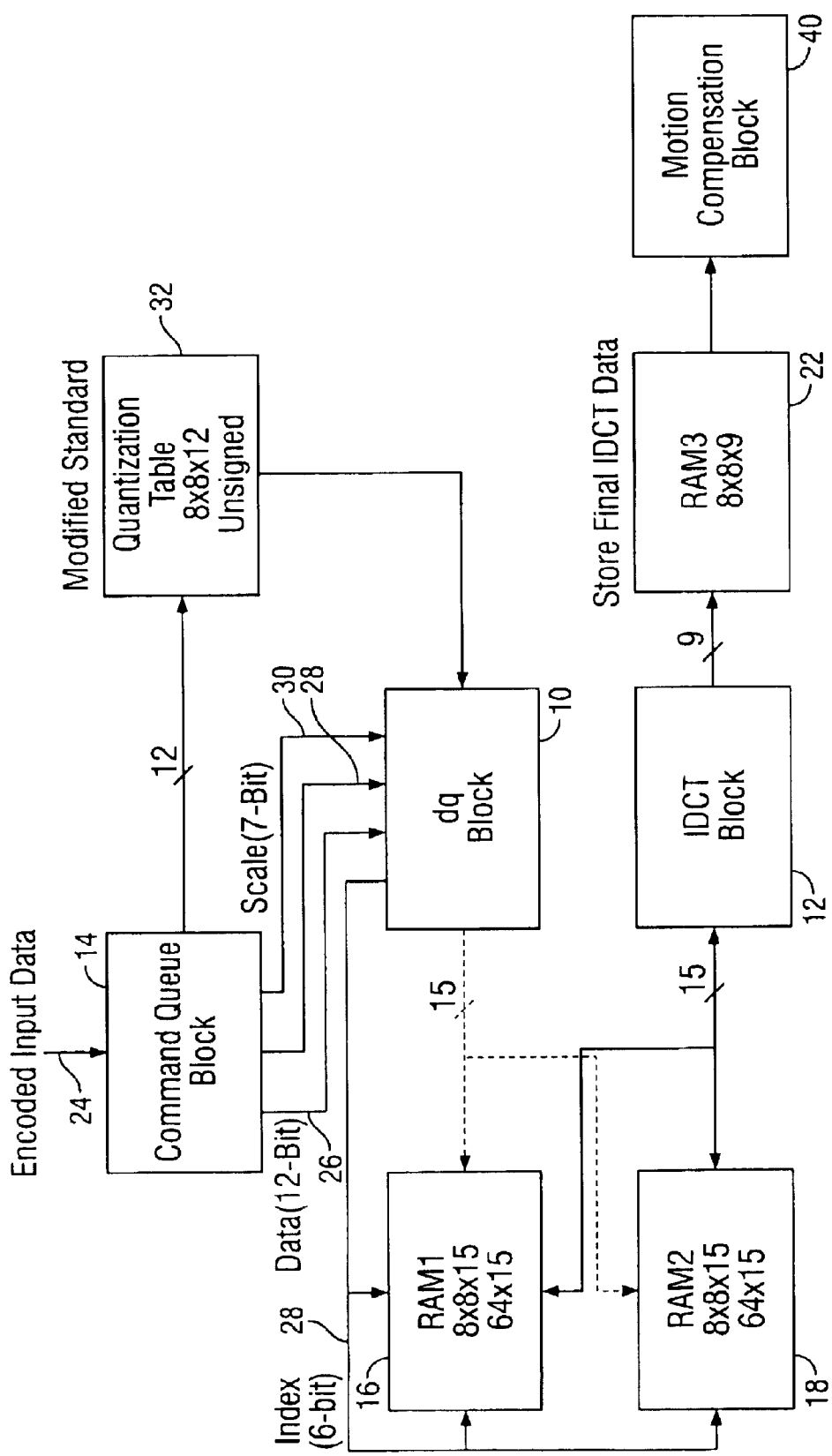
FIG. 1 is a block diagram illustrating data flow of encoded input data through a dequantization and IDCT block according to a presently preferred embodiment of the present invention.

Referring now to FIG. 1, a block diagram illustrates the parallel operation of a dequantization block 10 and IDCT block 12 according to a presently preferred embodiment of the present invention. Each block of data is obtained from the data stream via a command queue block 14 and processed. When a system reset, or start decoding signal, is received from the command queue block, both a first memory (RAM1) 16 and a second memory (RAM2) 18 are initialized to zeros. When the data from the command queue block 14 is ready, the dequantization block 10 and IDCT block 12 simultaneously process each block of data. According to a presently preferred embodiment of the present invention, the dequantization block 10 stores dequantization data to the first memory 16 or second memory 18, while the IDCT block 12 stores intermediate IDCT data (i.e., row or the column IDCT data) to the other memory. When the dequantization block 10 and IDCT block 12 have completed processing the block of data, each sends a signal to a motion compensation block 20. The final IDCT data is stored to a third memory (RAM3) 22 for use by the motion compensation block 20 as shown in FIG. 1, or is sent directly to the motion compensation block 20.

The command queue block 14 fetches commands and encoded input data in frame buffer memory, decodes the commands and dispatches the data to the dequantization block 10 and IDCT block 12. The command queue block 14 processes encoded Input data 24 and outputs command queue output data comprising a non-zero IDCT coefficient 26 with corresponding index 28 which determines the location of the IDCT coefficient 26 in the block, and a scale 30 representing a compression ratio of the encoded input data. The command queue output data (26, 28, 30) is then sent to the dequantization block 10. The index 28 transfers only non-zero IDCT coefficients from the command queue block 14 to the dequantization block 10. Therefore, only non-zero coefficients are dequantized. For timing purposes, the index 28 is used by the dequantization block 10 to store intermediate data in the first memory 16 and the second memory 18. According to a presently preferred embodiment, the IDCT coefficient 26 comprises 12 bits, the index 28 comprises 6 bits, and the scale 30 comprises 7 bits. In addition, the command queue block 14 outputs a modified standard quantization matrix 32 (DTD$^t$) depending upon the encoded input data stream. For example, if the input data comprises intra blocks, a standard quantization matrix T is used which is different from that used if the input data comprises non-intra blocks. The modified standard quantization matrix 32 is stored for use by the dequantization block 10. The modified standard quantization matrix 32, comprises DTD$^t$ where D is diagonal matrix.

```
C4, 0, 0, 0, 0, 0, 0, 0
0, C1, 0, 0, 0, 0, 0, 0
0, 0, C2, 0, 0, 0, 0, 0
0, 0, 0, C3, 0, 0, 0, 0
```

-continued

```
0, 0, 0, 0, C4, 0, 0, 0
0, 0, 0, 0, 0, C5, 0, 0
0, 0, 0, 0, 0, 0, C6, 0
0, 0, 0, 0, 0, 0, 0, C7
``` and T is the standard quantization matrix. For example, a default matrix for intra blocks is as follows:

```
 8 16 19 22 26 27 29 34
16 16 22 24 27 29 34 37
19 22 26 27 29 34 34 38
22 22 26 27 29 34 37 40
22 26 27 29 32 35 40 48
26 27 29 32 35 40 48 58
26 27 29 34 38 46 56 69
27 29 35 38 46 56 69 83
```

A default matrix for non-intra blocks is as follows:

```
16 16 16 16 16 16 16 16
16 16 16 16 16 16 16 16
16 16 16 16 16 16 16 16
16 16 16 16 16 16 16 16
16 16 16 16 16 16 16 16
16 16 16 16 16 16 16 16
16 16 16 16 16 16 16 16
16 16 16 16 16 16 16 16
```

The modified standard quantization matrix 32 DTD$^t$ is equivalent to TDD$^t$, where DD$^t$ is cosine matrix:

```
C4*C4, C4*C1, C4*C2, C4*C3, C4*C4, C4*C5, C4*C6, C4*C7
C1*C4, C1*C1, C1*C2, C1*C3, C1*C4, C1*C5, C1*C6, C1*C7
C2*C4, C2*C1, C2*C2, C2*C3, C2*C4, C2*C5, C2*C6, C2*C7
C3*C4, C3*C1, C3*C2, C3*C3, C3*C4, C3*C5, C3*C6, C3*C7
C4*C4, C4*C1, C4*C2, C4*C3, C4*C4, C4*C5, C4*C6, C4*C7
C5*C4, C5*C1, C5*C2, C5*C3, C5*C4, C5*C5, C5*C6, C5*C7
C6*C4, C6*C1, C6*C2, C6*C3, C6*C4, C6*C5, C6*C6, C6*C7
C7*C4, C7*C1, C7*C2, C7*C3, C7*C4, C7*C5, C7*C6, C7*C7
``` where $C_i = \cos(i\pi/16)$, where i=0, 1, 2, 3, 4, 5, 6, 7

The dequantization block 10 multiplies the modified standard quantization matrix 32 by the scale 30 and the non-zero IDCT coefficient matrix 26 to produce output data comprising DYD$^t$, Y is the non-zero IDCT coefficient matrix produced by the command queue block * SCALE * T, where T is the standard quantization matrix. A maximum of 64×2= 128 clock cycles are required for the dequantization block 10 to process one block of data, since only non-zero IDCT coefficients are processed. One of ordinary skill in the art, however, will appreciate that the modified standard quantization matrix 32 may be generated during, the dequantization process rather than prior to the dequantization process. According to a presently preferred embodiment of the present invention, the first memory 16 and the second memory 18 comprise a 64×15 RAM, respectively.

The IDCT block 12 processes blocks of data simultaneously with the dequantization block 10. The IDCT block 12 processes a block which has been processed by the dequantization block 10 and stored in either the first memory 16 or the second memory 18. The IDCT block 12 then outputs IDCT data to the motion compensation block 20. According to a presently preferred embodiment of the present invention, when the IDCT block 12 performs the IDCT calculations, it zeros the first memory 16 or the second memory 18 and stores the final IDCT data to the third memory 22 for use by the motion compensation block 20. However, those of ordinary skill in the art will readily recognize that the final IDCT data may be sent directly to the motion compensation block 20. A data-ready signal is then sent to the motion compensation block, which issues a done-read signal when it is ready to receive new data. According to a presently preferred embodiment of the present invention, the third memory comprises a 64×9 RAM. Data is sent to the dequantization block 10 and the IDCT BLOCK 12 every two cycles if the clock is faster than 50 MHz. Otherwise, the data is sent every clock cycle. However, those of ordinary skill in the art will readily recognize that data may be sent at various rates.

Dequantization

Figure 2:
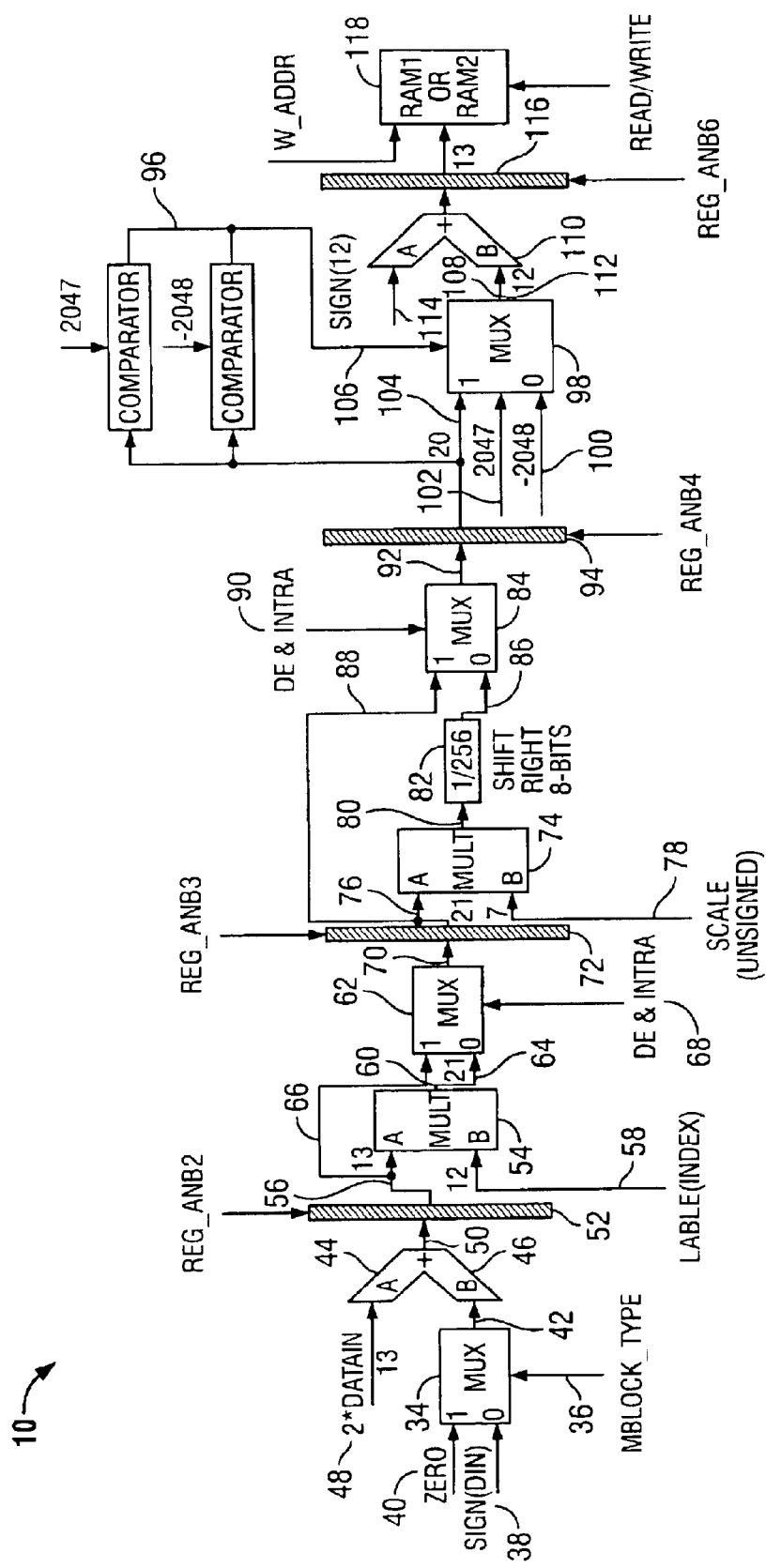
FIG. 2 illustrates a dequantization data path according to a presently preferred embodiment of the present invention.

Referring now to FIG. 2, a dequantization data path according to a presently preferred embodiment of the present invention is shown. The dequantization data path is used to multiply a selected non-zero IDCT coefficient 26 corresponding to the index 28, the scale 30, and the corresponding element of the modified standard quantization matrix 32. A first multiplexer 34 having a select line 36 operatively coupled to the macroblock type of the encoded data, a first data input 38 operatively coupled to a sign(din) corresponding to the sign of the IDCT coefficient din sent by the command queue block 14, and a second data input 40 operatively coupled to a zero input, produces an output 42. When the macroblock type of the encoded data is non-intra blocks, the select line 36 is a 0, selecting the first data input 38. However, when the macroblock type of the encoded data is intrablocks, the select line 36 is a 1, selecting, the second data input 40. When the input data is negative, the sign(din) is −1, when the input data is 0, the sign(din) is 0, and when the input data is positive, the sign(din) is 1.

A first adder 44 has a first input 46 operatively coupled to the output 42 from the first multiplexer 34 and a second input 48 operatively coupled to (2*IDCT coefficient din), and an output 50 operatively coupled to a first clocked flip-flop 52.

A first multiplier 54 has a first input 56 operatively coupled to the first clocked flip-flop 52, a second input 58 operatively coupled to a portion of the modified standard quantization matrix 32 corresponding to the index 28, and an output 60. The modified standard matrix 32 is produced by multiplying the 8 bit standard dequantization matrix T by the 8 bit diagonal cosine matrix. Since the standard dequantization matrix is shifted left 4 bits prior to multiplication, the output of the multiplication later needs to be shifted right 4 bits.

A second multiplexer 62 has a first input 64 operatively coupled to the output of the first multiplier 54, a second input 66 operatively coupled to the output from the first clocked flip-flop 52, a select line 68 operatively coupled to a DC-AND-INTRA indicator, indicating that the input data comprises intra blocks and the IDCT coefficient has frequency zero in both dimensions, and an output 70 operatively coupled to a second clocked flip-flop 72. If the select line 68 of the second multiplexer 62 is nonintra (0), the first input 64 is passed through to the output 70. However, if the select line 68 is DC (1) indicating the IDCT coefficient has frequency zero in both dimensions, the second input 66 is passed through to the output 70.

A second multiplier 74 has a first input 76 operatively coupled to the second clocked flip-flop 72, a second input 78 operatively coupled to the scale 30, and an output 80. The output 80 of the second multiplier 74 is shifted right 8 bits by a shifter 82. This is performed to counteract the shift left 4 bits performed during the multiplication, as discussed above. Furthermore, a second shift right 4-bits is required to keep precision to one decimal bit.

A third multiplexer 84 has a first input 86 operatively coupled to the shifted output from the second multiplier 74, a second input 88 operatively coupled to the second clocked-flip-flop 72, a select line 90 operatively coupled to DC_AND_INTRA indicator, and an output 92 operatively coupled to a third clocked flip-flop 94. If the select line 90 of the third multiplexer 84 indicates that the input data comprises non-Intra, blocks (e.g., the select line is 0), the first input 86 is passed through to- the output 92. However, if the select line 90 indicates that the input data comprises intra blocks and the IDCT coefficient has frequency zero in both dimensions (e.g., the select line is 1), the second input 88 is passed through to the output 92.

A comparator 96 has an input operatively coupled to the third clocked flip-flop 94. The comparator 96 determines whether the output 92 of the third multiplexer 84, or data, is greater than 2047 or less than −2048, for the 13 bit data in saturation mode.

A fourth multiplexer 98 has a first input 100 operatively coupled to −2048, a second input 102 operatively coupled to 2047, a third input 104 operatively coupled to the output of the third clocked flip-flop 94, a select line 106 operatively coupled to the comparator 96, and an output 108. If the comparator 96 determines that the output of the third multiplexer 92 is within the range −2048 through 2047, the third input 104 is passed through to the output 108. If the data is less than −2048, the first input 100 is passed through to the output 108. However, if the data is greater than 2047, the second input 102 is passed through to the output 108.

A second adder 110 having a first input 112 operatively coupled to the output 108 of the fourth multiplexer 98 and a second input 114 operatively coupled to the sign of the fourth multiplexer 98 output produces an output to a fourth clocked flip-flop 116. The contents of the fourth clocked flip-flop 116 are then written to either the first memory (RAM1) or the second memory (RAM2), referred to as a memory 118, as shown in FIG. 2. Each non-zero IDCT coefficient is multiplied by the scale and the corresponding element of the modified standard quantization matrix. Thus, after dequantization is completed for a block of data, the dequantization output data is stored in either the first memory (RAM1) or the second memory (RAM2). Although the circuit is configured in the described manner, one of ordinary skill in the art will appreciate that alternative configurations are possible.

IDCT

The standard IDCT method requires numerous additions and multiplications, and therefore is extremely time-consuming. A need exists in the prior art for a method and apparatus which minimizes the operations required in this process. According to a presently preferred embodiment of the present invention, this may be accomplished through the use of software according to a method derived as follows. The standard formula is converted to a one-dimensional formula:

$$f(y,x)=\tfrac{1}{4}\Sigma C(v)\cos((2y+1)v\pi/16)\Sigma C(u)\cos((2x+1)u\pi/16)F(u,v),$$
where $x, y, u, v$ are integers from $\{0,1,2,3,4,5,6,7\}$.

This formula is converted to matrix form $4X=UYU^t$ where Y is the command queue IDCT output data, and U is defined by the following matrix:

```
C4,  C1,  C2,  C3,  C4,  C5,  C6,  C7
C4,  C3,  C6, -C7, -C4, -C1, -C2, -C5
C4,  C5, -C6, -C1, -C4,  C7,  C2,  C3
C4,  C7, -C2, -C5,  C4,  C3, -C6, -C1
C4, -C7, -C2,  C5,  C4, -C3, -C6,  C1
C4, -C5, -C6,  C1, -C4, -C7,  C2, -C3
C4, -C3,  C6,  C7, -C4,  C1, -C2,  C5
C4, -C1,  C2, -C3,  C4, -C5,  C6, -C7
``` where $C_i = \cos(i\pi/16)$, where $i = 0, 1, 2, 3, 4, 5, 6, 7$

Through decomposition of the U matrix into F*D, this formula can then be converted to the following formula:

$$4X = FDYD^tF^t$$

where F is the following scaled matrix:

```
1,  1,              1,            1,             1,  1,             1,        1,
1, -1 + 2C2,       -1 + 2C4,     -1 + 2C6,      -1, -1 - 2C6,      -1 - 2C4, -1 - 2C2
1,  1 + 2C4 - 2C2,  1 - 2C4,      1 - 2C4 - 2C6, -1,  1 - 2C4 + 2C6, 1 + 2C4,  1 + 2C4 + 2C2
1, -1 - 2C4 + 4C2C4, -1,         -1 + 2C4 - 4C6C4, 1, -1 + 2C4 + 4C6C4, -1,   -1 - 2C4 - 4C2C4
1,  1 + 2C4 - 4C2C4, -1,          1 - 2C4 + 4C6C4, 1,  1 - 2C4 - 4C6C4, -1,    1 + 2C4 + 4C2C4
1, -1 - 2C4 - +2C2,  1 - 2C4,    -1 + 2C4 + 2C6, -1, -1 + 2C4 - 2C6,  1 + 2C4, -1 - 2C4 - 2C2
1,  1 - 2C2,       -1 + 2C4,      1 - 2C6,       -1,  1 + 2C6,      -1 - 2C4, 1 + 2C2
1, -1,              1,           -1,              1, -1,             1,       -1
``` and where D is the following diagonal cosine matrix:

```
C4, 0,  0,  0,  0,  0,  0,  0
0,  C1, 0,  0,  0,  0,  0,  0
0,  0,  C2, 0,  0,  0,  0,  0
0,  0,  0,  C3, 0,  0,  0,  0
0,  0,  0,  0,  C4, 0,  0,  0
0,  0,  0,  0,  0,  C5, 0,  0
0,  0,  0,  0,  0,  0,  C6, 0
0,  0,  0,  0,  0,  0,  0,  C7
```

Since D is a diagonal matrix, this reduces the number of operations required where zeros are ignored. Furthermore, scaled matrix F contains only 3 constants, C2, C4, and C6. Therefore, the present invention reduces the number of constants from 7 to 3.

Typically, the cosine matrix $DD^t$ is then multiplied by the Y matrix, the F matrix, and the $F^t$ matrix. However, since the cosine matrix $DD^t$ and the standard quantization matrix T have been combined in a previous step, the cosine matrix $DD^t$ is not multiplied during the IDCT process. The IDCT butterfly operations corresponding to the matrix X can then be derived. Since matrix F has only 3 constants, this minimizes the number of multiplications and additions performed. Moreover, since the resulting matrix is symmetric, the corresponding hardware implementation is improved, since gates are decreased and performance is increased.

Figure 3:
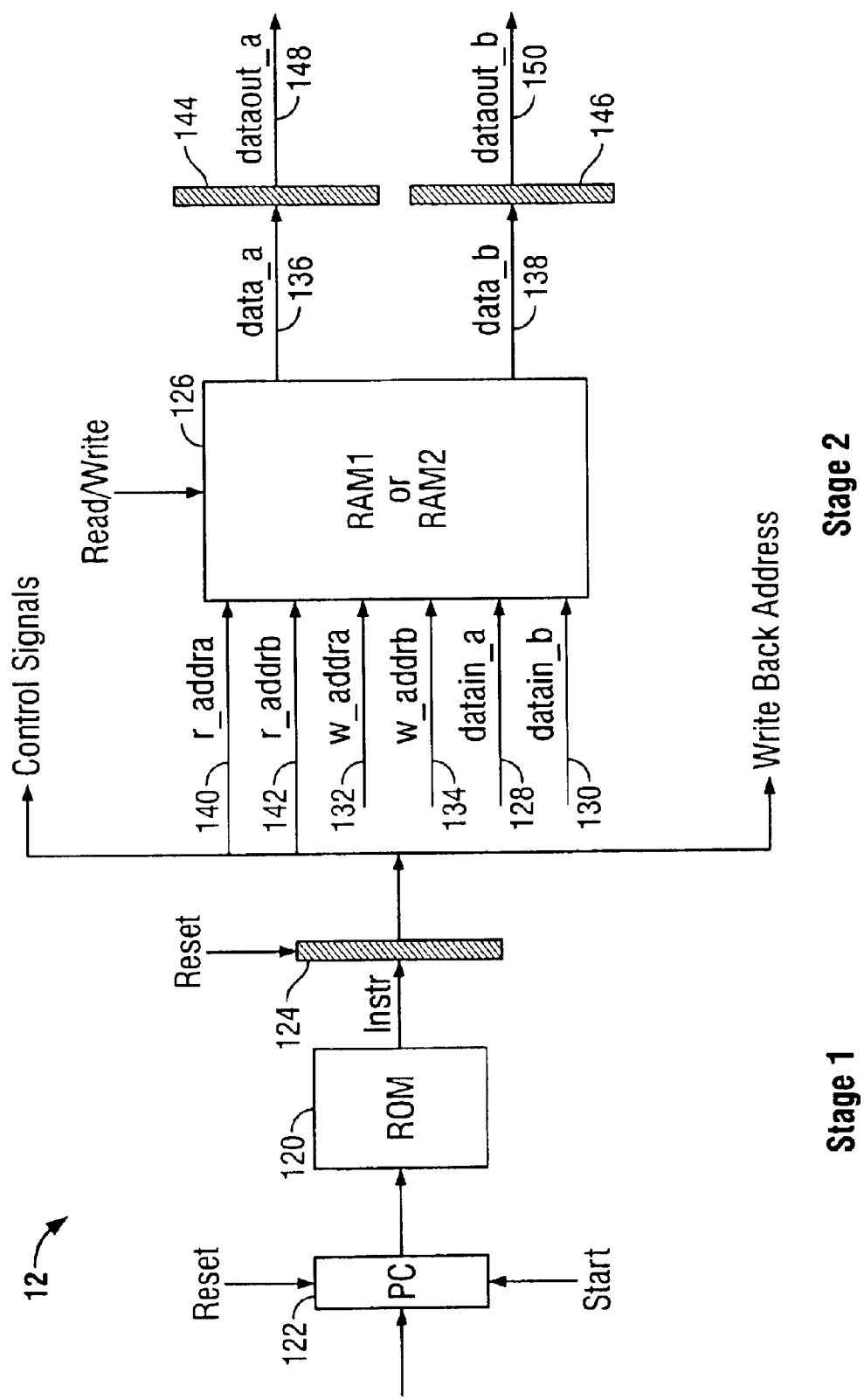
FIG. 3 illustrates control and data flow in an IDCT block according to a presently preferred embodiment of the present invention.

Referring now to FIG. 3, the IDCT data path according to a presently preferred embodiment of the present invention is shown. A ROM 120 stores microinstructions for controlling the IDCT block control and data lines depending upon which one of seven states, or clock cycles, the IDCT block is in. Instructions are selected by a computer operating under program control 122. Depending upon the microinstruction, a portion j of the dequantization output data is read from the first memory (RAM1) or the second memory (RAM2) referred to as a memory 126 in FIG. 3. The IDCT process uses a pipelining technique. According to a presently preferred embodiment of the present invention, the IDCT block performs column computations first, then stores intermediate data in the first memory (RAM1) or the second memory (RAM 2) 126. The final IDCT data is stored in the third memory 22, or can be sent directly to the Motion Compensation block 20, as explained, referring to FIG. 1. The first or second memory 126 is simultaneously reset to zero. The pipeline comprises four stages, each stage comprising one clock cycle. In a first stage, instructions are fetched from the ROM 120 and a first clocked flip-flop 124 is used for a system reset. In a second stage, the instructions are decoded and data is read from the first or second memory 126. Computing and storing are done at stage 3 and stage 4. Final IDCT data is stored in the third memory at stage 4.

The input data to the IDCT process is an 8×8 matrix. Each row or column of data comprises 8 input data, din0, din1, din.2, din3, din4, din5, din6, and din7. Both the first and second memory respectively comprise two write ports comprising datain_a 128 and datain_b 130, controlled by addresses w_addra 132 and w_addrb 134. The first and second memories further include two read ports comprising data_a 136 and data_b 138, controlled by addresses r_addra 140 and r_addrb 142. The read port data_a 136 feeds a second clocked flip-flop 144 and the read port datab 138 feeds a third clocked flip-flop 146, producing outputs data_a 148 and data_b 150. According to a presently preferred embodiment, each column of data is processed, then each row of data is processed, according to the butterfly calculations. For example, if the read ports data_a 136 and data_b 138 comprise din0 and din4, the corresponding values are obtained for the appropriate column or row of dequantization data stored in the first or second memory.

The IDCT butterfly calculations are performed for each of 64 data of the 8×8 block, and therefore require (7×8)+(7×8)=112 clock cycles to process one block of data. These formulas are as follows:

| | |
|---|---|
| 1. | $s3 = din3 + din5$ |
|    | $t3 = din3 - din5$ |
|    | $z3 = t3 * c3 - s3$ |
| 2. | $s1 = din1 + din7$ |
|    | $t1 = din1 - din7$ |
|    | $z1 = t1 * c1 - s1$ |
| 3. | $s2 = din2 + din6$ |
|    | $t2 = din2 - din6$ |
|    | $z2 = t2 * c2 - s2$ |
|    | $x3 = s1 + s3$ |
|    | $t4 = s1 - s3$ |
| 4. | $s5 = din0 + din4$ |
|    | $s4 = din0 - din4$ |
|    | $x7 = z1 + z3$ |
|    | $t5 = z1 - z3$ |
|    | $x8 = t5 * c2 - 0$ |
|    | $temp2 = x8 - x3 = t5 * c2 - x3$ |

-continued

```
5.        x1 = s5 + s2
          x2 = s5 − s2
          x5 = s4 + z2
          x6 = s4 − z2
          x4 = t4 * c2 − 0
          temp1 = x4 − x7 = t4 * c2 − x7
6.        dout0 = x1 + x3
          dout3 = x2 + temp2
          dout7 = x1 − x3
          dout4 = x2 − temp2
7.        dout2 = x6 + temp1
          dout1 = x5 + x7
          dout5 = x6 − temp1
          dout6 = x5 − x7
          Butterfly constants:
          c1 = 1 1101 1001
          c2 = 1 0110 1010
          c3 = 0 1100 0100
```

Figure 4A:
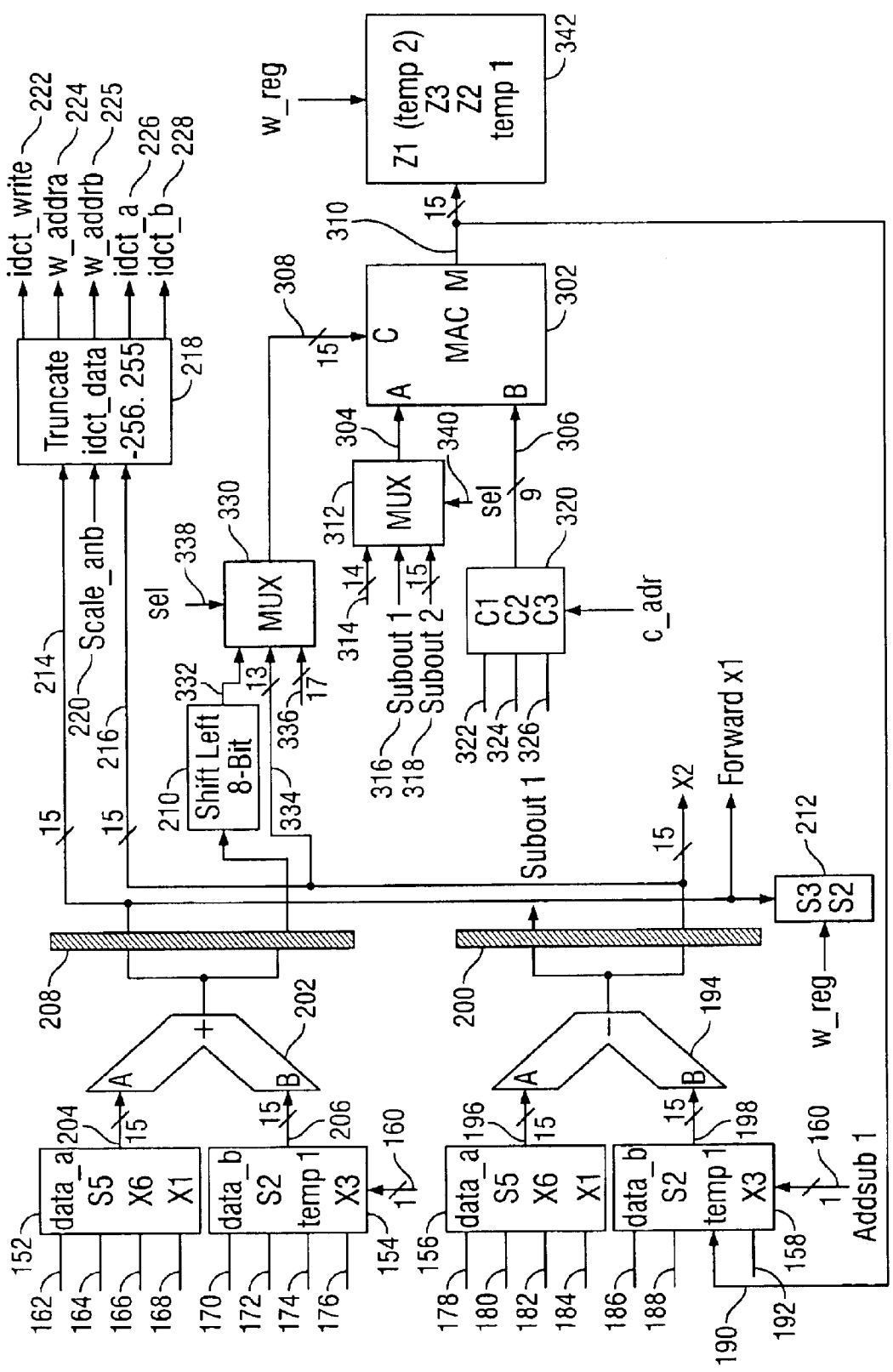

Referring now to FIG. 4A, an IDCT data path according to a presently preferred embodiment of the present invention is shown. More particularly, stages 3 and 4, comprising the butterfly calculations, are shown. Although the circuit is configured in the following manner, those of ordinary skill in the art will appreciate that alternative configurations are possible.

According to a presently preferred embodiment of the present invention, the IDCT block uses two adders, two subtractors, and one multiplier and accumulator (MAC), each of which operate at one clock cycle. However, one of ordinary skill in the art will readily recognize that an adder, subtractor, or multiplier may be implemented with various circuitry.

According to a presently preferred embodiment of the present invention, the IDCT data path comprises a first multiplexer 152, a second multiplexer 154, a third multiplexer 156, and a fourth multiplexer 158. Each of the multiplexers comprises a first data input, a second data input, a third data input, a fourth data input, a select line, and an output. According to a presently preferred embodiment of the present invention, the select lines 160 for the first, second, third, and fourth multiplexers are identical, and may be operatively coupled to each other. One of ordinary skill in the art, therefore, will readily recognize that the inputs to each multiplexer may be interchanged while preserving the butterfly calculations.

According to a presently preferred embodiment of the present invention, the first data input 162 of the first multiplexer 152 is memory output data_a 148, the second data input 164 of the first multiplexer 152 is s5, the third data input 166 of the first multiplexer 152 is x6, and the fourth data input 168 of the first multiplexer 152 is x1. Similarly, the first data input 170 of the second multiplexer 154 is memory output data_b 150, the second data input 172 of the second multiplexer 154 is s2, the third data input 174 of the second multiplexer 154 is temp1, and the fourth data input 176 of the second multiplexer 154 is x3. In addition, the first data input 178 of the third multiplexer 156 is memory output data_a 148, the second data input 180 of the third multiplexer 156 is s5, the third data input 182 of the third multiplexer is x6, and the fourth data input 184 of the third multiplexer 156 is x1. Finally, the first data input 186 of the fourth multiplexer 158 is memory output data_b 150, the second data input 188 of the fourth multiplexer 158 is s2, the third data input 190 of the fourth multiplexer 158 is temp1, and the fourth data input 192 of the fourth multiplexer 158 is x3. The data inputs d_a 162, d_b 170, d_a 178 and d_b 186 of the first 152, second 154, third 156 and fourth 158 multiplexers respectively are operatively coupled to the first and second memory 126 via one of outputs 148, 150.

According to a presently preferred embodiment of the present invention, the IDCT block comprises two adders, two subtractors, a multiplier and accumulator (MAC), a shifter, and a means for truncating final IDCT data. A first subtractor 194 has a first input 196 operatively coupled to the output of the third multiplexer 156, a second input 198 operatively coupled to the output of the fourth multiplexer 158, and an output. The output of the first subtractor 194 is operatively coupled to a fourth clocked flip-flop 200. For example, to calculate x2=s5−s2, the second data inputs 180 and 188 of the third and fourth multiplexers 156, 158 respectively are selected, and the resultant output x2 is operatively coupled to the fourth clocked flip-flop 200.

A first adder 202 has a first input 204 operatively coupled to the output of the first multiplexer 152, a second input 206 operatively coupled to the output of the second multiplexer 154, and an output. The output of the first adder 202 is operatively coupled to a fifth clocked flip-flop 208, which is further operatively coupled to a shifter 210, since each time multiplication by a cosine constant is required, a shift left 8-bits must be performed to align the decimal points. In order to minimize memory accesses, the output of the fifth flip-flop 208 is stored in a register 212. For example, s3 and s2 are each stored in a separate register. When the second data inputs 164, 172 of the first and second multiplexers 152, 154 respectively are selected, x1 is calculated to be the sum of s2 and s5. Value 1 is then forwarded for use by the next operation.

The outputs of the first adder 202 and first subtractor 194 are operatively coupled to a first input 214 and a second input 216, respectively, of a truncate data block 218. The truncate data block further includes a third SCALE_ENB input 220. The SCALE_ENB input 220 is a scale enable signal which enables the truncate data block 218 during row calculations, and disables the truncate data block 218 during column calculations. One of ordinary skill in the art, however, will readily recognize that the row and column calculations could be performed in the reverse order. The truncate data block 218 has five outputs: IDCT write 222, w_addra 224 corresponding to the addresses w addra 132 of FIG. 3, and w-addrb 225 corresponding to the addresses w_addrb 134 of FIG. 3, idct_a 226, and idct_b 228 operatively coupled to the motion compensation block 20 of FIG. 1. According to a presently preferred embodiment of the present invention, two idct row calculations are simultaneously processed by the truncate data block 218, and output through the outputs idct_a 226 and idct_b 228. These two values are written to an address indicated by the outputs w_addra 224 and w_addrb 225 when indicated by the outputs idct_write 222. After each column of data is processed, the intermediate IDCT data is written to either the first or second memory 126 of FIG. 3. However, once the final row calculations are completed, the truncate data block 218 truncates the data prior to outputting the final IDCT data to the motion compensation block 20. The truncate data block 218 truncates the data to 9 bit IDCT data in saturation mode, allowing data values −256 through 255 to be output.

Referring now to FIG. 4B, an IDCT data path further comprises a fifth 230, sixth 232, seventh 234, and eighth 236 multiplexer. Each of the multiplexers comprises a first data input, a second data input, a third data input, a fourth data input, a fifth data input, a select line, and an output. The data inputs of the fifth, sixth, seventh, and eighth multiplexers are operatively coupled to the data from the previous calculation results, such as s1=din1+din7 from the output of the first adder 208. According to a presently preferred embodiment of the present invention, the select lines 238 for the fifth, sixth, seventh, and eighth multiplexers are identical, and may be operatively coupled to each other. One of ordinary skill in the art, therefore, will readily recognize that the inputs to each multiplexer may be interchanged while preserving the butterfly calculations.

According to a presently preferred embodiment of the present invention, the first data input 240 of the fifth multiplexer 230 is s1, the second data input 242 of the fifth multiplexer 230 is z1, the third data input 244 of the fifth multiplexer 230 is s4, the fourth data input 246 of the fifth multiplexer 230 is x2, and the fifth data input 248 of the fifth multiplexer 230 is x5. Similarly, the first data input 250 of the sixth multiplexer 232 is s3, the second data input 252 of the sixth multiplexer 232 is z3, the third data input 254 of the sixth multiplexer 232 is z2, the fourth data input 256 of the sixth multiplexer 232 is tmp2, and the fifth data input 258 of the sixth multiplexer 232 is x7. In addition, the first data input 260 of the seventh multiplexer 234 is s1, the second data input 262 of the seventh multiplexer 234 is z1, the third data input 264 of the seventh multiplexer 234 is s4, the fourth data input 266 of the seventh multiplexer 234 is x2, and the fifth data input 268 of the seventh multiplexer 234 is x5. Finally, the first data input 270 of the eighth multiplexer 236 is s3, the second data input 272 of the eighth multiplexer 236 is z3, the third data input 274 of the eighth multiplexer 236 is z2, the fourth data input 276 of the eighth multiplexer 236 is tmp2, and the fifth data input 278 of the eighth multiplexer 236 is x7.

A second subtractor 280 has a first input 282 operatively coupled to the output of the seventh multiplexer 234, a second input 284 operatively coupled to the output of the eighth multiplexer 236, and an output. The output of the second subtractor 280 is operatively coupled to a sixth clocked flip-flop 286. In order to minimize memory accesses, the output is stored in a register 288. Therefore, for example, t4 and x6 are each stored in a separate register.

A second adder 290 has a first input 292 operatively coupled to the output of the fifth multiplexer 230, a second input 294 operatively coupled to the output of the sixth multiplexer 232, and an output. The output of the second adder 290 is operatively coupled to a seventh clocked flip-flop 296, which is further operatively coupled to a shifter 298, since each time multiplication by a cosine constant is required, a shift left 8-bits must be performed to align the decimal points. In order to minimize memory accesses, the output of the seventh flip-flop 296 is stored in a register 300. For example, x3, x7, and x5 are each stored in a separate register.

A multiplier and accumulator (MAC) 302 having a subtractor has a first port 304, a second port 306, a third port 308, and an output 310. The first port 304 is operatively coupled to an output of a ninth multiplexer 312 having a first input 314 operatively coupled to t4, a second input 316 operatively coupled to the output of the first subtractor 194, or the fourth clocked flip-flop 200, and a third input 318 operatively coupled to the output of the second subtractor 280, or the sixth clocked flip-flop 286. The second port 306 of the MAC 302 is operatively coupled to an output of a tenth multiplexer 320 having a first input 322 operatively coupled to butterfly constant CL, a second input 324 operatively coupled to butterfly constant C2 and a third input 326 operatively coupled to butterfly constant C3. Select line 328 is adapted for selecting butterfly constant C1, C2 or C3 according to the butterfly calculations set forth above. The third port 308 is operatively coupled to an output of an eleventh multiplexer 330, the eleventh multiplexer 330 having a first input 332 operatively coupled to the output of the shifter 298, a second input 334 operatively coupled to x3, and a third input 336 operatively coupled to x7. Select lines 338 and 340 to the ninth 312 and eleventh 330 multiplexers respectively are coordinated with the multiplexer data inputs to produce the butterfly calculations as set forth above. The MAC 302 multiplies the value at the first port 304 and the value at the second port 306, and subtracts the value at the third port 308. The output of the MAC 302, i.e., z1, z2, z3, or tmp1, is then written to a memory location, such as register 342. These output values may each be stored in a separate register. Alternatively, values may be stored in the same location if they are used at different times, ensuring that results are not overwritten.

The outputs of the second adder 290 and second subtractor 280 are operatively coupled to the truncate data block 218. After each column of data is processed, the intermediate IDCT data is written to either the first or second memory 126 of FIG. 3. However, once the final row calculations are completed, the truncate data block 218 truncates the data prior to outputting the final IDCT data to the motion compensation block 20 of FIG. 1. The truncate data block 218 truncates the final data to 9 bit IDCT data in saturation mode, allowing data values –256–255 to be output. Upon completion of processing by the IDCT block 12, each row of final IDCT data is written to the third memory 22 for use by the motion compensation block 20, as shown in FIG. 1.

The hardware implementation for the IDCT block minimizes the number of clock cycles required. For a resolution of 640×480, the number of macroblocks processed by an MPEG-II decoder is 640/16×480/16=1200. Thus, for a macroblock having a 4:2:0 format, the number of blocks processed by the IDCT block is 1200×6=7200. One of ordinary skill in the art will readily recognize that alternative chroma formats are possible. For example, a 4:2:2 chroma format would require that 1200×8=9600 blocks be processed. Since it takes 7 clock cycles to process one row of data, 7*(8+8)=112 clocks are required to process one 8×8 block. Therefore, 112*7200=0.8064 Mclocks are required to process one frame. With a 10% overhead to move data in or out, a 0.1*0.8064 Mclks=0.08064 Mclks pipeline stall results. Therefore, the speed of the IDCT calculations according to the present invention is (0.8064+0.08064)*30=26.6 Mclks for a 30 frame per second motion picture quality.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claim.

What is claimed is:

1. In a video decoder, an apparatus for performing dequantization and IDCT calculations in parallel, said apparatus comprising:

a dequantization block capable of performing dequantization calculations on a block of encoded video signal data using a modified standard quantization matrix, the block of encoded video signal data including data comprising a plurality of IDCT coefficients corresponding to a block of encoded input data stream, and an index for determining a location of the data within the block, the index transferring only non-zero data, the modified standard quantization matrix being a product of a standard quantization matrix and a cosine matrix, the dequantization block producing dequantization output data; and an IDCT block capable of performing IDCT calculations on the dequantization output data, wherein said dequantization block and said IDCT block process each block of encoded video signal data in parallel.

2. The apparatus according to claim 1, further including:

a command queue block having an input operatively coupled to an encoded input data stream, said command queue block outputting the modified standard quantization matrix and the block of encoded video signal data corresponding to one block of the input data stream for use by said dequantization block.

3. The apparatus in accordance with claim 2, wherein said command queue block generates the modified standard quantization matrix using a first standard quantization matrix if the encoded input data stream includes intra blocks, and using a second standard quantization matrix different from the first standard quantization matrix if the encoded input data stream includes non-intra blocks.

4. The apparatus according to claim 1, wherein said block of encoded video signal data further includes:

a scale indicating a compression ratio for the block of the encoded input data stream.

5. The apparatus in accordance with claim 1, further comprising:

a pair of memories coupled to said dequantization block and to said IDCT block, wherein said dequantization block stores the dequantization output data to a first one of said pair of memories, and wherein said IDCT block processes the dequantization output data stored in the first memory, stores intermediate IDCT data to a second one of said pair of memories, and clearing the second memory when IDCT calculations are completed and final IDCT data is sent out.

6. In a video decoder, a method for performing dequantization and IDCT calculations in parallel, said method comprising:

performing dequantization calculations on a block of encoded video signal data using a modified standard quantization matrix, the block of encoded video signal data including data comprising a plurality of IDCT coefficients corresponding to a block of encoded input data stream, and an index for determining a location of the data within the block, the index transferring only non-zero data, the modified standard quantization matrix being a product of a standard quantization matrix and a cosine matrix, the dequantization block producing dequantization output data; and butterfly calculations on the dequantization output data, wherein said performing dequantization calculations and said performing IDCT butterfly calculations are performed in parallel for each block of encoded video signal data.

7. The method of claim 6, wherein the block of encoded video signal data further includes:

a scale indicating a compression ratio for the block of encoded video data stream.

8. The method of claim 6, wherein said performing dequantization calculations includes:

receiving the standard quantization matrix corresponding to a block of encoded video data stream;

multiplying a diagonal cosine matrix and the standard quantization matrix to create the modified standard quantization matrix;

generating a scale representing a compression ratio of the encoded video data stream;

generating a plurality of IDCT coefficients corresponding to the block of encoded video data stream; and generating an index determining a location of data within the block, the index transferring only non-zero data.

9. The method of claim 8, wherein said performing dequantization calculations further includes:

receiving the modified standard quantization matrix, the scale, and a non-zero IDCT coefficient matrix with the index; and multiplying the scale, the non-zero IDCT coefficient matrix, and the modified standard quantization matrix.

10. The method of claim 6, wherein said performing IDCT butterfly calculations includes:

performing IDCT row calculations on the dequantization output data; and performing IDCT column calculations on the dequantization output data, wherein said IDCT row and column calculations are performed through a plurality of stages.

11. The method of claim 10, wherein a first one of the plurality of stages includes:

receiving a third dequantization output value in a sequence of dequantization output values;

receiving a fifth dequantization output value in the sequence of dequantization output values;

adding the third dequantization output value and the fifth dequantization output value to produce a third sum;

subtracting the fifth dequantization output value from the third dequantization output value to produce a third difference;

multiplying the third difference by a third butterfly constant to produce a third product; and subtracting the third sum from the third product to produce a third value.

12. The method of claim 11, wherein a second one of the plurality of stages includes:

receiving a first dequantization output value in a sequence of dequantization output values;

receiving a seventh dequantization output value in the sequence of dequantization output values;

adding the first dequantization output value and the seventh dequantization output value to produce a first sum;

subtracting the seventh dequantization output value from the first dequantization output value to produce a first difference;

multiplying the first difference by a first butterfly constant to produce a first product; and subtracting the first sum from the first product to produce a first value.

13. The method of claim 12, wherein a third one of the plurality of stages includes:

receiving a second dequantization output value in the sequence of dequantization output values;

receiving a sixth dequantization output value in the sequence of dequantization output values;

adding the second dequantization output value and the sixth dequantization output value to produce a second sum;

subtracting the sixth dequantization output value from the second dequantization output value to produce a second difference;

multiplying the second difference by a second butterfly constant to produce a second product;

subtracting the second sum from the second product to produce a second value;

adding the first sum and the third sum to produce a third intermediate value; and subtracting the third sum from the first sum to produce a fourth difference.

14. The method of claim 13, wherein a fourth one of the plurality of stages includes:

receiving a zeroth dequantization output value in the sequence of dequantization output values;

receiving a fourth dequantization output value in the sequence of dequantization output values;

adding the zeroth dequantization output value and the fourth dequantization output value to produce a fifth sum;

subtracting the fourth dequantization output value from the zeroth dequantization output value to produce a fourth sum;

adding the first value and the third value to produce a seventh intermediate value;

subtracting the third value from the first value to produce a fifth difference;

multiplying the fifth difference and a second butterfly constant to produce an eighth intermediate value; and subtracting the third intermediate value from the eighth intermediate value to produce a second temporary value.

15. The method of claim 14, wherein a fifth one of the plurality of stages includes:

adding the fifth sum and the second sum to produce a first intermediate value;

subtracting the second sum from the fifth sum to produce a second intermediate value;

adding the fourth sum and the second value to produce a fifth intermediate value;

subtracting the second value from the fourth sum to produce a sixth intermediate value;

multiplying the fourth difference and the second butterfly constant to produce a fourth intermediate value; and subtracting the seventh intermediate value from the fourth intermediate value to produce a first temporary value.

16. The method of claim 15, wherein a sixth one of the plurality of stages includes:

adding the first intermediate value and the third intermediate value to produce a zeroth output value;

adding the second intermediate value and the second temporary value to produce a third output value;

subtracting the third intermediate value from the first intermediate value to produce a seventh output value; and subtracting the second temporary value from the second intermediate value to produce a fourth output value.

17. The method of claim 16, wherein a seventh one of the plurality of stages includes:

adding the sixth intermediate value and the first temporary value to produce a second output value;

adding the fifth intermediate value and the seventh intermediate value to produce a first output value; and subtracting the first temporary value from the sixth intermediate value to produce a fifth output value; and subtracting the seventh intermediate value from the fifth intermediate value to produce a sixth output value.

18. The method in accordance with claim 6, further comprising:

storing the dequantization output data to a first memory;

storing intermediate IDCT data to a second memory after performing IDCT butterfly calculations on the dequantization output data stored in the first memory; and clearing the second memory when the IDCT butterfly calculations are completed and final IDCT data is produced.

19. The method in accordance with claim 6, further comprising:

generating the modified standard quantization matrix using a first standard quantization matrix if an encoded input data stream includes intra blocks, and using a second standard quantization matrix different from the first standard quantization matrix if the encoded input data stream includes non-intra blocks.

20. An apparatus for performing dequantization and IDCT calculations in parallel in a video decoder, comprising:

means for performing dequantization calculations on a block of encoded video signal data using a modified standard quantization matrix, the block of encoded video signal data including data comprising a plurality of IDCT coefficients corresponding to a block of encoded input data stream, and an index for determining a location of the data within the block, the index transferring only non-zero data, the modified standard quantization matrix being a product of a standard quantization matrix and a cosine matrix, the dequantization block producing dequantization output data; and means for performing IDCT butterfly calculations on the dequantization output data, wherein the dequantization calculations and the IDCT butterfly calculations are performed in parallel for each block of encoded video signal data.

21. The apparatus of claim 20, further comprising:

means for receiving a standard quantization matrix corresponding to a block of encoded video data stream;

means for multiplying a diagonal cosine matrix and the standard quantization matrix to create the modified standard quantization matrix;

means for outputting the modified standard quantization matrix and the block of encoded video signal data, the block of encoded video signal data further including a scale representing a compression ratio of the block of encoded video data stream.

22. The apparatus of claim 21, wherein said means for performing dequantization calculations includes:

means for receiving the modified standard quantization matrix and the block of encoded video signal data; and means for multiplying the scale, the non-zero IDCT coefficient matrix, and the modified standard quantization matrix.

23. The apparatus of claim 20, wherein said means for performing IDCT butterfly calculations includes:

means for performing IDCT row calculations on the dequantization output data; and means for performing IDCT column calculations on the dequantization output data, wherein said IDCT row and column calculations are performed through a plurality of stages.

24. The apparatus of claim 23, wherein a first one of the plurality of stages includes:

receiving a third dequantization output value in a sequence of dequantization output values;

receiving a fifth dequantization output value in the sequence of dequantization output values;

adding the third dequantization output value and the fifth dequantization output value to produce a third sum;

subtracting the fifth dequantization output value from the third dequantization output value to produce a third difference;

multiplying the third difference by a third butterfly constant to produce a third product; and subtracting the third sum from the third product to produce a third value.

25. The apparatus of claim 24, wherein a second one of the plurality of stages includes:

receiving a first dequantization output value in a sequence of dequantization output values;

receiving a seventh dequantization output value in the sequence of dequantization output values;

adding the first dequantization output value and the seventh dequantization output value to produce a first sum;

subtracting the seventh dequantization output value from the first dequantization output value to produce a first difference;

multiplying the first difference by a first butterfly constant to produce a first product; and subtracting the first sum from the first product to produce a first value.

26. The apparatus of claim 25, wherein a third one of the plurality of stages includes:

receiving a second dequantization output value in the sequence of dequantization output values;

receiving a sixth dequantization output value in the sequence of dequantization output values;

adding the second dequantization output value and the sixth dequantization output value to produce a second sum;

subtracting the sixth dequantization output value from the second dequantization output value to produce a second difference;

multiplying the second difference by a second butterfly constant to produce a second product;

subtracting the second sum from the second product to produce a second value;

adding the first sum and the third sum to produce a third intermediate value; and subtracting the third sum from the first sum to produce a fourth difference.

27. The apparatus of claim 26, wherein a fourth one of the plurality of stages includes:

receiving a zeroth dequantization output value in the sequence of dequantization output values;

receiving a fourth dequantization output value in the sequence of dequantization output values;

adding the zeroth dequantization output value and the fourth dequantization output value to produce a fifth sum;

subtracting the fourth dequantization output value from the zeroth dequantization output value to produce a fourth sum;

adding the first value and the third value to produce a seventh intermediate value;

subtracting the third value from the first value to produce a fifth difference;

multiplying the fifth difference and a second butterfly constant to produce an eighth intermediate value; and subtracting the third intermediate value from the eighth intermediate value to produce a second temporary value.

28. The apparatus of claim 27, wherein a fifth one of the plurality of stages includes:

adding the fifth sum and the second sum to produce a first intermediate value;

subtracting the second sum from the fifth sum to produce a second intermediate value;

adding the fourth sum and the second value to produce a fifth intermediate value;

subtracting the second value from the fourth sum to produce a sixth intermediate value;

multiplying the fourth difference and the second butterfly constant to produce a fourth intermediate value; and subtracting the seventh intermediate value from the fourth intermediate value to produce a first temporary value.

29. The apparatus of claim 28, wherein a sixth one of the plurality of stages includes:

adding the first intermediate value and the third intermediate value to produce a zeroth output value;

adding the second intermediate value and the second temporary value to produce a third output value;

subtracting the third intermediate value from the first intermediate value to produce a seventh output value; and subtracting the second temporary value from the second intermediate value to produce a fourth output value.

30. The apparatus of claim 29, wherein a seventh one of the plurality of stages includes:

adding the sixth intermediate value and the first temporary value to produce a second output value;

adding the fifth intermediate value and the seventh intermediate value to produce a first output value; and subtracting the first temporary value from the sixth intermediate value to produce a fifth output value; and subtracting the seventh intermediate value from the fifth intermediate value to produce a sixth output value.

31. The apparatus in accordance with claim 20, further comprising:

means for storing the dequantization output data to a first memory;

means for storing intermediate IDCT data to a second memory after performing IDCT butterfly calculations on the dequantization output data stored in the first memory; and means for clearing the second memory when the IDCT butterfly calculations are completed and final IDCT data is produced.

32. The apparatus in accordance with claim 20, further comprising:

means for generating the modified standard quantization matrix using a first standard quantization matrix if an encoded input data stream includes intra blocks, and using a second standard quantization matrix different from the first standard quantization matrix if the encoded input data stream includes non-intra blocks.

33. A program storage device readable by a machine, tangibly embodying a program of instructions executable by the machine to perform a method for performing dequantization and IDCT calculations in parallel in a video decoder, the method comprising:

performing dequantization calculations on a block of encoded video signal data using a modified standard quantization matrix, the block of encoded video signal data including data comprising a plurality of IDCT coefficients corresponding to a block of encoded input data stream and an index for determining a location of the data within the block the index transferring only non-zero data, the modified standard quantization matrix being a product of a standard quantization matrix and a cosine matrix, the dequantization block producing dequantization output data; and performing IDCT butterfly calculations on the dequantization output data, wherein said performing dequantization calculations and said performing IDCT butterfly calculations are performed in parallel for each block of encoded video signal data.

34. In a video decoder, an apparatus for performing dequantization and IDCT calculations in parallel, comprising:

a command queue block having an input operatively coupled to an encoded video data stream, said command queue block outputting:
   a modified standard quantization matrix corresponding to one block of the encoded video data stream;
   a plurality of IDCT coefficients corresponding to the block; and
   an index for determining a location of the data within the block, the index transferring only non-zero data;
a dequantization block coupled to said command queue block, said dequantization block performing dequantization calculations on the block using the modified standard quantization matrix and non-zero IDCT coefficients so as to produce dequantization output data; and
an IDCT block coupled capable of performing IDCT calculations on the dequantization output data.

35. In a video decoder, a method for performing dequantization and IDCT calculations in parallel, said method comprising:

receiving a modified standard quantization matrix corresponding to a block of encoded video data stream, the modified standard quantization matrix being a product of a diagonal cosine matrix and a standard quantization matrix;

receiving a scale representing a compression ratio of the block of encoded video data stream;

receiving a non-zero IDCT coefficient matrix corresponding to the block of the encoded video data stream;

receiving an index determining a location of data within the block, the index transferring only non-zero data;

multiplying the scale, the non-zero IDCT coefficient matrix, and the modified standard quantization matrix so as to produce dequantization output data; and performing IDCT butterfly calculations on the dequantization output data.

36. In a video decoder, an apparatus for performing dequantization and IDCT calculations in parallel, said apparatus comprising:

means for receiving a modified standard quantization matrix corresponding to a block of encoded video data stream, the modified standard quantization matrix being a product of a diagonal cosine matrix and a standard quantization matrix;

means for receiving a scale representing a compression ratio of the block of encoded video data stream;

means for receiving a non-zero IDCT coefficient matrix corresponding to the block of the encoded video data stream;

means for receiving an index determining a location of data within the block, the index transferring only non-zero data;

means for multiplying the scale, the non-zero IDCT coefficient matrix, and the modified standard quantization matrix so as to produce dequantization output data; and means for performing IDCT butterfly calculations on the dequantization output data.

37. A program storage device readable by a machine, tangibly embodying a program of instructions executable by the machine to perform a method for performing, in a video decoder, dequantization and IDCT calculations in parallel, said method comprising:

receiving a modified standard quantization matrix corresponding to a block of encoded video data stream, the modified standard quantization matrix being a product of a diagonal cosine matrix and a standard quantization matrix;

receiving a scale representing a compression ratio of the block of encoded video data stream;

receiving a non-zero IDCT coefficient matrix corresponding to the block of the encoded video data stream;

receiving an index determining a location of data within the block, the index transferring only non-zero data;

multiplying the scale, the non-zero IDCT coefficient matrix, and the modified standard quantization matrix so as to produce dequantization output data; and performing IDCT butterfly calculations on the dequantization output data.

* * * * *